United States Patent [19]

Litt

[11] Patent Number: 5,078,910

[45] Date of Patent: Jan. 7, 1992

[54] POLIMERIZATION OF LIQUID CRYSTALLINE MONOMERS

[75] Inventor: Morton H. Litt, University Heights, Ohio

[73] Assignee: Edison Polymer Innovation Corp., Broadview Heights, Ohio

[21] Appl. No.: 369,205

[22] Filed: Jun. 20, 1989

[51] Int. Cl.$^5$ .................. C09K 19/52; C08F 12/30; C08F 18/00; C08G 59/00

[52] U.S. Cl. .................. 252/299.01; 528/418; 528/421; 526/286; 526/320; 526/326; 428/1

[58] Field of Search .............. 252/299.01, 299.61, 252/582, 299.6, 299.67; 549/560, 554, 555, 556, 567; 526/286, 320, 326; 528/418, 421; 428/1

[56] References Cited

U.S. PATENT DOCUMENTS

| | | |
|---|---|---|
| 4,101,207 | 7/1978 | Taylor .................. 252/299.01 |
| 4,293,435 | 10/1981 | Portugall et al. .................. 252/299.01 |
| 4,631,328 | 12/1986 | Ringsdorf et al. .................. 252/299.01 |
| 4,696,990 | 9/1987 | Noonan .................. 252/299.01 |
| 4,713,196 | 12/1987 | Kohne et al. .................. 252/299.01 |
| 4,728,547 | 3/1988 | Vaz et al. .................. 252/299.01 |
| 4,762,912 | 8/1988 | Leslie et al. .................. 252/299.01 |

FOREIGN PATENT DOCUMENTS

| | | |
|---|---|---|
| 0261712 | 3/1988 | European Pat. Off. ........ 252/299.01 |
| 293911 | 12/1988 | European Pat. Off. ........ 252/299.01 |

OTHER PUBLICATIONS

Blumstein, A. et al., Liquid Crystals and Ordered Fluids, vol. 4, 1984, pp. 311-345.

Clough, S. B. et al., Polymer Preprints, vol. 18, No. 2, 1977, pp. 1-4.

"Polymerization of Thermotropic Mesophases and Formation of Organized Polymers", Blumstein, pp. 133/147.

"Polymerization on Polycationic Backbones", Blumstein et al., pp. 189/211.

"Effects of Macromolecular Matrix on the Process of Radical Polymerization of Ionizable Monomers", Tsuchida et al., pp. 599/569.

No. 82 "Synthese et polymerisation de nouveraux monomeres mesomorphes" (1), Strzeleck et al., pp. 597/608.

"Chemabstracts/136739r; Chemabstracts/66389t; Chemabstracts 13546g; ; Chemabstracts/50145a".

Primary Examiner—John S. Maples
Assistant Examiner—Philip Tucker
Attorney, Agent, or Firm—D. Peter Hochberg; Mark Kusner; Louis J. Weisz

[57] ABSTRACT

Polymeric compositions exhibiting superior physical properties, useful in the fabrication of composites and other applications, are prepared by the polymerization of thermotropic, monomeric materials having orderable molecular structures. The monomers comprise molecules containing mesogen groups with side chains on either end thereof terminated with reactive groups, the reactive groups being separated from the mesogens by spacer atoms. The monomers are polymerized in their crystalline or liquid crystalline state, or under conditions which assure that at least part of the monomeric molecules are in an ordered state. The reactive groups which are consequently in proximity with each other, are thereby capable of interaction without molecular diffusion, allowing substantially complete polymerizations to be achieved despite the increasing conversion and glass transition temperature of the polymers being formed.

1 Claim, No Drawings

POLIMERIZATION OF LIQUID CRYSTALLINE MONOMERS

FIELD OF THE INVENTION

This application relates to structurally organized polymers, and to methods for their preparation. More particularly, this invention relates to the preparation of polymers with ordering mesogens contained therein that can be polymerized in ordered layers. Specifically, this invention relates to mesogen-containing monomers separated from reactive groups on the two ends thereof by spacer atoms, such monomers being capable of polymerization to form ordered molecular structures.

BACKGROUND OF THE INVENTION

In carrying out homogeneous polymerizations with typical monomers, the reactive sites on the separate monomer molecules are located relatively far from each other. Consequently, in order for the polymerization reaction to proceed, the monomer molecules must be sufficiently mobile within the reaction mixture so that they can diffuse to locations that bring the reactive sites into contact with each other. Unfortunately, as the polymerization reaction proceeds, the glass transition temperature, $T_g$, of the forming polymer rises as the conversion increases, reducing the rate of diffusion of the monomer molecules within the mixture, and slowing the polymerization as a result. Consequently, it is impossible to obtain a high $T_g$ polymer by polymerizing monomeric materials in an isotropic state at low temperatures because of the inhibiting influence of the rising $T_g$. Stating the effect differently, when molecular diffusion ceases, a polymerization reaction is no longer possible, seriously limiting the degree of reaction completion that can be achieved with homogeneous polymerizations. Since it is necessary to increase the reaction temperature during the polymerization to maintain a practical rate of diffusion, it is impossible to achieve substantial polymerizations at low temperature.

By way of contrast, where the reaction sites of the monomer molecules in heterogeneous polymerizations can be maintained in spatially adjacent positions, relatively complete reactions can be obtained even in substantially molecularly immobile systems. Consequently, heterogeneous polymerization systems in which the reacting monomers are structured to possess ordering moieties or segments, offer the possibility of obtaining polymerizations yielding polymers with substantial glass transition temperatures, in relatively complete conversions. This is true even at reactive temperatures substantially below the resulting polymers' glass transition temperatures, since it is unnecessary to promote molecular diffusion by heating the reaction mixtures.

Liquid crystalline and crystalline materials contain such ordering segments in the form of rigid portions, termed "mesogens". Such materials are capable of molecular ordering, including nematic and smectic ordering, in which the molecules arrange themselves in heterogeneous adjacent, molecular configurations wherein the molecules are aligned in parallel relationship to each other.

Thermotropic liquid crystalline monomers and polymers have been intensely studied during recent years, the primary interest up to the present time being the temperature ranges in which liquid crystalline formations can be observed, as well as the relaxation times, or "creep" rates shown by the materials. Difunctional vinyl monomers which exhibit liquid crystalline behavior have, for example, been synthesized and heterogeneously polymerized to form cross-linked polymers by Strzelecki et al, Bull. Chem. Soc. de France 2,597,603,605 (1973). The resulting polymers thus produced, however, are brittle, crystalline materials, lacking the "toughness" required for products capable of widespread application.

Various other organized or liquid crystalline systems which, however, possess a single functional group, have also been employed. For example, styrene-sulfonic acid organized by reaction with ionenes has yielded cationic polymers in reactions displaying appreciable rate enhancements over those of homogeneous monomers at the same concentration. Ionenes have also been used in the past by Tsuchida et al., J. Polymer Sci. 13, 559 (1975), to increase the rates of methacrylic and acrylic acid polymerizations. Konstantinov et al., Vysokomol. Soed., 9A 2236 (1967) has polymerized methacrylyl oxybenzoic in the liquid crystalline state at higher rates, than those obtained in the isotropic state. Cholesteric liquid crystalline monomers, e.g., cholestryl methacrylate, have been polymerized by Saki et al., Polymer J., 3, 414 (1972), at rates considerably more rapid than those obtained during the polymerization of such materials in the isotropic state at even higher temperatures. The polymerization of monofunctional monomers, however, yields polymers with large side chains; consequently, polymers so produced tend to yield high $T_g$, brittle materials, again limiting their usefulness.

BRIEF DISCLOSURE OF THE INVENTION

In view of the foregoing, therefore, it is a first aspect of this invention to provide monomers with functional end groups, separated by spacer atoms from the mesogens contained in the monomers.

It is a second aspect of this invention to provide a way in which monomers can be polymerized at temperatures that include those substantially below the glass transition temperatures of the resulting polymers.

Another aspect of this invention is to produce polymers with high glass transition temperatures, employing low temperature reactions.

A further aspect of this invention is to provide monomers that can be polymerized without any need to promote the diffusion of the monomers throughout the reaction medium during the polymerization by the application of heat.

An additional aspect of this invention is to provide tough, molecularly ordered polymers, which show valuable electrical and other unique properties, useful in a variety of applications.

A still further aspect of this invention is to provide heterogeneous polymerization systems in which reactive sites are positioned adjacent to each other, facilitating the ease and speed of their chemical interaction.

Yet a further aspect of this invention is to provide polymerization systems in which substantially all of the cross-linking reaction sites interact with each other.

An additional aspect of this invention is to provide highly polymerized systems possessing molecular order, which exhibit a wide range of desirable physical properties.

A further aspect of this invention is to produce polymers characterized in having anisotropic structural features.

The foregoing and additional aspects of the invention are provided by liquid crystalline and crystalline monomer molecules useful in preparing polymeric structures possessing molecularly ordered regions therein, comprising mesogen-containing molecules, said mesogens having two side chains attached thereto that contain functional groups at the ends thereof, wherein said mesogens and said functional groups are separated by at least two to about eighteen spacer atoms.

The foregoing and other aspects of the invention are provided by the process of preparing polymeric structures possessing molecularly ordered regions comprising polymerizing mesogen-containing monomer molecules, said mesogens having two side chains attached thereto that contain a functional group at the ends thereof, wherein said mesogens and said end groups are separated by at least two to about eighteen spacer atoms, that includes polymerizing said molecules at a temperature no higher than the temperature required to maintain or generate, at least some molecular ordering.

The foregoing and still further aspects of the invention are provided by a polymer prepared by polymerizing a monomer according to the penultimate paragraph.

DETAILED DESCRIPTION OF THE INVENTION

Certain types of molecules, referred to as "smectic liquid crystalline materials," are capable of ordering themselves in a mesomorphic state in which the molecules are arranged in a lamellar structure, with all, or substantially all of the molecules locally lying parallel to each other. When so ordered, the molecules within a domain form parallel adjacent layers due to the mesogens contained in the molecules, which tend to position themselves adjacent to each other as a result of their spatial configurations. Since the side chains of the liquid crystalline molecules contemplated by the invention, located on both sides of the mesogen groups, are substantially the same in length, the ends of the side chains are juxtaposed to each other in adjacent structures or layers.

Liquid crystalline materials of the type described normally assume an ordered form at temperatures from about 10° to 90° C., and they tend to be relatively small molecules. The liquid crystalline and crystalline materials are rather turbid in appearance until their temperature is increased above their "clearing temperature", where the turbidity disappears as the materials enter the isotropic region. While much of the crystalline ordering disappears above the clearing temperature, some ordering of the molecules is still present even at temperatures somewhat above the clearing point.

When reactive end groups are incorporated at the ends of the monomeric materials, their adjacency permits them to interact even though the glass transition temperature of the forming polymer increases during their interaction, since no diffusion of the groups is necessary to bring them into contact with each other. Consequently, in such molecules, conversion rates of 90%, or above, are generally attainable. Furthermore, since the functional groups on the ends of the side chains extending from individual molecules are contained in separate reactive structures or layers, cyclization does not present a problem.

Surprisingly, the monomers of the invention undergo little shrinkage during the process of polymerization, compared to ordinary polymers. Thus the resulting polymers avoid the strains resulting from shrinkage commonly experienced in typical polymers. Such avoidance makes the inventive polymers extremely useful as "potting" compounds, for instance.

While as previously described, difunctional mesogens have been previously prepared, the result has been the production of highly crystalline, brittle materials of limited usefulness. Surprisingly, it has been found that the introduction of linked "spacer" atoms between the reactive end groups, and the mesogens, provides a flexibility which results in "tough" non-brittle molecules, useful in broad applications. Typically, such molecules will have a molecular weight of from about 300 to 700, although molecular weights greater or less than that number may also provide useful properties. The polymers so formed exhibit relatively high glass transition temperatures due to the fact that the central region of the molecules is cyclic, providing the necessary crystalline ordering, while the end or terminal part of the chains are inter-reacted, giving a relatively "tight" cross-linked network.

Since as is apparent from the preceding, the reactive ends of the molecules are concentrated into a small fraction of the material's molecular volume, and are in physical contact with each other, the reactive groups at the ends can interact readily to give high conversions. Consequently, there is no tendency for the polymerization to terminate as the result of reduced diffusion, and concurrent reduced contact of the reactive groups, as the glass transition temperature rises.

Furthermore, the proximity of the reactive groups with each other assures that the reaction can take place rapidly, since little or no molecular motion is needed for group interaction.

While it has been found that spacer groups are required in order to avoid the crystalline brittleness described, when the side chains become too long, undesirably soft materials are produced. Monovinyl liquid crystal monomers and polymers extensively studied in some laboratories are, therefore, inappropriate for uses where mechanical strength is a desirable characteristic.

A variety of mesogen materials may be used, such as cyclic compounds and their various derivatives. In general, mesogens will be those of the standard liquid crystal types, for example, those of the general formula

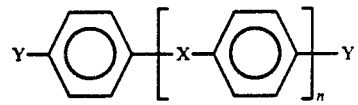

where "x" is -, $CH_2CH_2$, $CH_2S$, $CH_2O$,

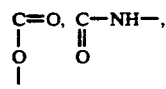

or equivalent groups, where "n" is 0, 1, or 2, and where "Y" will generally be O, S,

or their equivalent.

Examples of suitable mesogenic materials include spiro compounds; trans-cyclohexyl analogues; biphenyls, e.g. dioxy biphenyl; aromatic esters and diesters; 1, 2, bis (oxyphenyl) ethane; 4, 4' biphenol; methylstilbene; 4, 4'-dihydroxy methyl stilbene; and terphenyl, whether the preceding are substituted or unsubstituted, as well as other mesogens of the types known to the art. It is preferable that no more than about three such mesogen groups be contained in the monomers of the invention, however, in order to avoid an undesirably high melting temperature and degree of crystallinity. By suitably adjusting the length and nature of the side chains, and that of the mesogen "core", the liquid crystalline temperature range of the monomers of the invention may be suitably adjusted. By making such adjustments, for instance, it has been found possible to synthesize liquid crystalline materials with a range of from about 10° to 90° C.

Various spacer groups which have been found useful for the purposes of introducing the linked spacer atoms of the invention, including spacer groups such as poly-(oxyethylene) groups, —CH$_2$—CH$_2$O—; poly(methylene) groups, —CH$_2$—, as well as equivalent groups. Generally, it has been found desirable to employ from at least 1 to about 11 spacer atoms derived from such groups between each of the functional terminal, or end groups, and the mesogen groups, a maximum of about 18 being necessary to avoid undesirable properties.

In preferred embodiments of the invention, where the polymerizable, functional group is an acrylic or methacrylic ester, and the mesogen is a bicyclic compound with oxygen linkages such as, for instance,

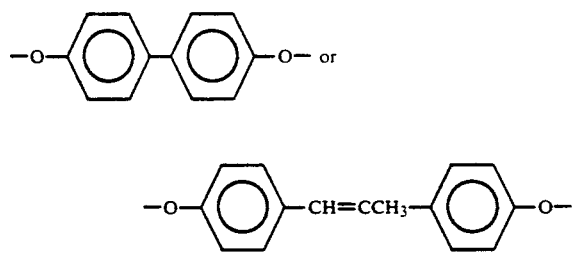

the number of spacer atoms will usually be 2, 3, 6 or 11. Where the functional group is an epoxy group and the mesogen is

"n" will typically be 1 or 4. In instances where the polymerizable group is a vinyl ether, "n" will often be 2, and where the group is a vinyl group, "n" will usually be from 2 to about 18.

It has also been found possible to lower the true melting point of the monomers, sometimes desirable, by introducing a degree of asymmetry in the monomers, for example, by putting a substituent, for instance, F, Cl, CN or CH$_3$ on a cyclic group, or on the side chains.

A variety of reactive groups can be incorporated at the ends of the monomers, for example, vinyl groups comprising compounds such as acrylate esters, methacrylate esters, and others, including the vinyl ethers and esters. Amino groups, including amino ethyl or amino propyl groups are also useful, as are epoxy groups, which may be reacted by means of amine curing, or otherwise. The use of additional reactive groups of the types well known in the art is also possible.

Polymerization of the ordered systems may be accomplished by any of the standard polymerization techniques employed in the art, including the use of thermal energy; free radical initiators together with promoters, for instance, peroxides and azo initiators; through the use of thermal initiators or photo initiators, for example 1-hydroxycyclohexyl phenyl ketone, in conjunction with exposure to ultraviolet light; and in the case of epoxy groups, amines, including compounds such as o-phenylene diamine, diethylenetriamine, and others may be used.

Generally, it has been found desirable to control the temperature of polymerization within, or slightly above the liquid crystalline range of the monomer being employed. In the latter regard, while the polymerization is preferably carried out within the liquid crystalline temperature range, i.e., below the clearing temperature of the monomers, when the temperature is raised somewhat above that temperature, semiorganized polymers are still obtainable. Consequently, the relative degree of crystallinity of the polymer, and therefore, its physical characteristics can be controlled by controlling the polymerization temperature, an empirical relationship easily determined through routine experimentation. While the polymerizations are normally run within the liquid crystalline temperature range, mesomorphic-type polymers can be obtained even when the temperature is increased to the point where polymerizations are carried out in the isotropic region; however, as previously explained, the polymerization temperature range will seldom be much above the clearing point of the liquid crystalline monomers, usually no more than about 50° above such point. Monomeric materials polymerized in the liquid crystal phase show particularly strong birefringence; however, even monomers polymerized in the isotropic phase exhibit some liquid crystalline organization, especially in the case of the acrylate polymers. Furthermore, the polymers produced are substantially completely cross-linked.

In instances where particularly highly ordered systems are required, it is believed that monomers of the invention exhibiting a high degree of anisotropy can be ordered, or "poled", by exposure to an electrical or magnetic field during the polymerization process, thereby producing even more highly ordered polymers.

Polymers of the invention exhibit moduli over a broad range, for example, from about 50,000 psi to 300,000 psi, depending upon the nature of the variables selected, including such things as the number of linking atoms in the spacer portions of the monomer molecules. Likewise, polymers having a wide range of glass transition temperatures may be prepared, for instance, from about 50° C. to about 180° C.

In instances where the dielectric constant at room temperature is low, the materials are useful in applications such as electrical "potting" compounds, in which low dielectric constants are desirable.

The polymers of the invention are particularly useful in the fabrication of composite matrices utilizing continuous or staple fibers such as glass fibers, graphite fibers, and the like.

While not intended to be limiting in nature, the following examples are illustrative of the invention.

MONOMER PREPARATION

A variety of difunctional monomers of the invention are prepared and polymerized as follows. The monomer synthesis involves preparation of the appropriate alcohol and its subsequent conversion, for example, into an ester by reaction with the appropriate acryloyl chloride compound.

PREPARATION OF 4,4'-DIOXYBIPHENYL ALCOHOLS

In a typical preparation, a mixture of biphenol (9.3 g, 0.050 mole), potassium hydroxide (7.45 g, 0.133 mole), 3-bromopropanol (27.8 g, 0.200 mole) (for the preparation with 6-chlorohexanol, 0.120 mole of potassium iodide is also added) is added in 200 ml of 95% ethanol. The solution is stirred at its reflux temperature for 30 hours. After the distillation of 120 ml of ethanol, 300 ml of 1% (by weight) sodium hydroxide solution is added, and the mixture is stirred for an additional 20 minutes more. The resulting precipitate is filtered, washed with water and dried under vacuum. The product is recrystallized from dioxane to yield 13.99 g (93%) of white crystals. Characterization for a variety of compounds thus prepared are presented in Table 1, below, in which B stands for the 4, 4' dioxybiphenyl mesogen, while the number represents the methylene units separating the biphenyl mesogen from the OH group.

TABLE 1

| Biphenyl alcohols | m.p. (°C.)[a] | 200 MH$_z$ $^1$H-NMR (DMSO-d$_6$, $\sigma$, ppm) |
|---|---|---|
| B3OH | 200 | 1.88 (m, 4H —C$\underline{H}_2$—); 3.58 (t, 4H O—C$\underline{H}_2$—); 4.08 (t, 4H ph—O—C$\underline{H}_2$); 4.59 (t, 2H —O$\underline{H}$—); 7.01 to 7.51 (8 aromatic protons). |
| B6OH | 97[b] and 178 | 1.44 to 1.76 (m, 16H —(C$\underline{H}_2$)$_4$); 3.42 (t, 4H, O—C$\underline{H}_2$—); 4.02 (t, 4H, ph—O—C$\underline{H}_2$—); 4.18 (t, 2H, —O—H); 7.0 to 7.49 (8 aromatic protons). |
| B11OH | 161 | 1.29 to 1.74 (m, 36H, —(C$\underline{H}_2$)$_9$—; 3.20 (t, 2H, —O—H); 3.40 (t, 4H, O—C$\underline{H}_2$—); 4.01 (t, 4H, —O—C$\underline{H}_2$—); 6.99 to 7.48 (8 aromatic protons). |

[a]Melting points were determined by DSC using 20° C./min heating rate.
[b]B6OH has a melting point of 97° C. and a clearing point of 178° C.

PREPARATION OF 4,4'-DIOXYPHENYL METHACRYLATE AND ACRYLATE ESTERS

All the methacrylate esters and acrylate esters are synthesized by the esterification of the corresponding alcohol, with methacryloyl chloride or acryloyl chloride, as the case might be.

SYNTHESIS

Typical syntheses are illustrated in the following.

In a dry three-neck flask equipped with a thermometer, a pressure-equilibrated dropping funnel, and a reflux condenser (top fitted with a CaCl$_2$ drying tube), a mixture of B3OH, (3.02 g, 0.0100 mole), phenothiazine (20mg, 0.00010 mole) and 200 ml of fresh dichloroethane is heated to reflux. Acryloyl chloride (2.75 g, 0.0300 mole) is added dropwise over a period of one hour. After the addition is complete, the mixture is refluxed for 3 more hours (5 hours for methacrylation). The cooled solution is washed with 5% sodium bicarbonate solution three times, once with water, and is then evaporated to dryness. Further purification is carried out by column chromatography using acidic silica gel as the stationary phase, and mixed solvents as the eluent, using standard techniques. After the solvent is evaporated in a rotovapor, the obtained acrylate ester monomer is recrystallized very slowly from methanol (from ethanol in the case of monomers with 11 methylene groups) to yield 2.71 g (66%) of product in the form of particles exhibiting the appearance of "flat flakes".

In a somewhat different synthesis, used for the preparation of methacrylate esters, in a dry round-bottom flask equipped with a pressureequilibrated dropping funnel, top fitted with a calcium chloride drying tube, B6OH (3.86 g, 0.0100 mole) and phenothiazine (20 mg, 0.00010 mole) are dissolved in 380 ml of dry pyridine at room temperature. Methacryloyl chloride (2.53 g, 0.0240 mole) is added dropwise over a period of one hour. After the addition is complete, the mixture is stirred for 36 hours. The resulting mixture is then poured into dilute sulfuric acid solution containing crushed ice. The precipitate is collected by centrifugation and dried at room temperature. Further purification is carried out by column chromatography and recrystallization as described in the preceding synthesis. The yield is 3.76 g, (72%) of product having the physical appearance of white needles.

Analyses for representative monomers are listed in the following Table 2, in which A stands for acrylate and M for methacrylate, and the number again represents the methylene units or groups separating the mesogen from the A or M, as the case may be.

TABLE 2

| | Physical Properties and Analysis of Typical Monomers synthesized | | | | | |
|---|---|---|---|---|---|---|
| Monomer type | Crystal form | Yield (%) | Carbon (%) | | Hydrogen (%) | |
| | | | calc. | found | calc. | found |
| B3M | flat flakes | 61 | 71.21 | 70.70 | 6.90 | 6.77 |
| B3A | flat flakes | 66 | 70.23 | 70.17 | 6.38 | 6.41 |
| B6M | flat flakes | 63 | 73.53 | 73.24 | 8.10 | 8.22 |
| B6A | flat flakes | 71 | 72.85 | 72.96 | 7.74 | 7.84 |
| B11M | flat flakes | 65 | 76.09 | 75.91 | 9.43 | 9.44 |
| B11A | flat flakes | 63 | 75.67 | 75.34 | 9.21 | 9.35 |

POLYMERIZATION

Samples of the monomers are polymerized by melting the material on a clean glass slide and allowing the isotropic liquid to run under a coverslip by capillary action. While various polymerization techniques are employed as described in the following, the monomers, including those of the vinyl ether and epoxy types, can also be polymerized cationically with either photo, or thermal initiators.

PHOTOPOLYMERIZATION

The monomer of interest is mixed with 0.1 to 3%, by weight, of a photoinitiator, Irgacure 184, and 0.01% to 0.05% of di-t-butyl phenol in chloroform. The solution is dried by using a Rotovapor, and then further dried overnight in a vacuum oven. The fine monomer powder is placed between two glass plates previously treated with 0.1%, by weight, of trimethyl chlorosilane in chloroform and heated at about 100° C. to 110° C. for 30 minutes. A polymer film spacer having a thickness of about 0.2 to 0.4 mm is used to separate the plates. The monomer so prepared is then heated to its melting temperature in a vacuum oven to remove entrapped air, and cooled slowly in an oven after the vacuum is relieved. The monomer film may thereafter be UV-cured in a Q-UV chamber, or in a heating oven, using a General Electric J3 Sunlamp as the UV radiation source. The use of higher intensity, commercial-type UV lamps accelerates curing times greatly.

The following Table 4 lists typical treatment times and temperatures.

TABLE 4

| Monomer | Reaction Chamber, Q-UV, °C. (time) | Oven, °C. (time) |
|---|---|---|
| B2A | 55 (3 days); 60 (5 days), 70 (3 days); 72 (3 days) | 102 (30 hrs) |
| B3A | 68 (24 hrs); 72 (10 hrs) | 85 (10 hrs) |
| B6A | 68 (24 hrs) | |
| B11A | 45 (24 hrs); 72 (10 hrs) | 85 (10 hrs) |
| B3M | 70 (24 hrs) | 100 (5 hrs) |

POLYMERIZATION IN ELECTRICAL FIELD

In a subsequent experiment, photopolymerization is conducted in an electrical field by placing monomer powder, prepared as in the preceding example, between two conductive glass plates, previously surface treated with 0.1% of trimethyl chlorosilane in chloroform before use. A polymer spacer, polyethylene terephthalate having a thickness of about 0.2 to 0.4 mm is used to control the thickness of the sample. After the monomer is melted in a vacuum oven, a direct current electrical field of 10 to 40 volts is applied to the conductive glass plates. Two techniques are used, in a first, the sample is slowly cooled in the oven under normal atmospheric pressure, and is then UV-cured in the electrical field in a Q-UV chamber at a controlled temperature. In a second technique, the sample is cooled slowly to 60° C., and then UV-cured in the oven with a J3 Sunlamp as the UV radiation source. The temperature of the chamber is controlled by circulating heated air through the oven at a temperature of between 55° C. to 60° C.

The following Table 5 describes typical field strengths, temperatures and polymerization times.

TABLE 5

| Monomer | Electric Field | Temperature °C. | Polymerization Time |
|---|---|---|---|
| First Procedure | | | |
| B2A | 40 V | 55 | 4 days |
| B2A | 10 V | 55 | 3 days |
| B2A | 40 V | 70 | 3 days |
| Second Procedure | | | |
| B2A | 20 V | 55/60 | 5 hours |

THERMOPOLYMERIZATION

In a further experiment, a thermopolymerization technique is used. In this procedure, the pure monomer is placed between two glass plates with a polyethylene terephthalate spacer having a thickness of about 0.2 to 0.4 mm. The sample is then heated to its melting temperature in a vacuum oven at about 100° C. The vacuum is thereafter relieved, and the temperature is raised to about 150° C. for 24 hours. The sample is then slowly cooled to room temperature.

Representative relationships between typical polymers prepared by the process of the invention, illustrating polymerization temperatures relative to the polymers' glass transition temperatures, are shown in the following Table 6.

TABLE 6

| Polymer | Polymerization Temp. | $T_g$ (1 Hz) |
|---|---|---|
| B2A | 50–73° C. | 58° C. |
| B3A | 60–75° C. (liquid crystalline) | 185° C. |
| B3A | 85–100° C. (isotropic) | 155° C. |
| B3M | 70° C. (liquid crystalline) | 175° C. |
| B3M | 100° C. (isotropic) | 155° C. |
| B6A | 68° C. | 100° C. |
| B11A | 20–100° C. | 55° C. |

The following Table 7 describes typical thermal polymerization temperatures and reaction times.

TABLE 7

| Monomer | Temperature °C. | Time (hours) |
|---|---|---|
| B2A | 150 | 24 |
| B11A | 150 | 24 |

PREPARATION OF 4, 4' DIOXYMETHYLSTILBENE ALCOHOLS

In a still further experiment, methylstilbene alcohols are prepared using the procedures previously described for the preparation of the 4, 4'-dioxybiphenyl alcohols.

Characterization of the alcohols produced is set out in Table 8, below, in which S represents methyl stilbene.

TABLE 8

| Characterization of Typical Biphenyl Alcohols by $^1$H-NMR | | |
|---|---|---|
| Biphenyl alcohol | m.p. (°C.) | 200 MHz $^1$H-NMR (DMSO-D$_6$, δ, ppm) |
| S30H | 157 | 1.89(m, 4H, —C$\underline{H}_2$—); |
| | | 2.20(s, 3H, C$\underline{H}_3$—C$\overset{ph}{\underset{\|}{=}}$); |
| | | 3.59(t, 4H, O—C$\underline{H}_2$—; |
| | | 4.08(t, 4H, ph-O—C$\underline{H}_2$—); |
| | | 4.60(t, 2H, —O$\underline{H}$); |
| | | 6.79(s, 1H, H—$\overset{ph}{\underset{\|}{C}}$=C); |
| | | 6.98 to 7.48 (8 aromatic protons). |
| S60H | 69$^b$ | 1.42 to 1.76(m, 16H, —(C$\underline{H}_2$)$_4$—); |
| | | 2.22(s, 3H, C$\underline{H}_3$—C=); |
| and | | 3.40(t, 4H, O—C$\underline{H}_2$—); |
| | | 4.01(t, 4H, ph-O—C$\underline{H}_2$); |

TABLE 8-continued

| Biphenyl alcohol | m.p. (°C.) | 200 MHz $^1$H-NMR (DMSO-D$_6$, δ, ppm) |
|---|---|---|
| | 132 | 4.40(t, 2H, —O$\underline{H}$); ph |
| | | 6.78(s, 1H, $\underline{H}$—C=C); |
| | | 6.97 to 7.48 (8 aromatic protons). |
| S110H | 157 | 1.29 to 1.74(m, 36H, —(C$\underline{H}_2$)$_9$—); ph |
| | | 2.22(s, 3H, C$\underline{H}_3$—C=); |
| | | 3.20(t, 2H, —O—$\underline{H}$); |
| | | 3.40(t, 4H, O—C$\underline{H}_2$—); |
| | | 4.01(t, 4H, ph-O—C$\underline{H}_2$—); ph |
| | | 6.78(s, 1H, $\underline{H}$—C=); |
| | | 6.98 to 7.84 (8 aromatic protons). |

*M.p were determined by DSC using 20° C. min. heating rate.
$^b$S60H has a m.p of 69° C. and a clearing point of 132° C.

PREPARATION OF 4, 4'-DIOXYMETHYLSTILBENE METHACRYLATE AND ACRYLATE ESTERS

The procedure for preparation of the esters is substantially the same as that previously described in connection with the 4, 4'-dioxyphenyl methacrylate and acrylate esters. Element analyses for the monomers thus formed are listed in Table 9. For reference, S stands for methyl stilbene, while the number indicates the number of CH$_2$ groups in the spacer; A indicates acrylates, and M stands for methacrylate.

TABLE 9

| Physical Properties and Analysis of Typical Monomers Synthesized | | | | | | |
|---|---|---|---|---|---|---|
| Monomer type | Crystal form | Yield (%) | Carbon % | | Hydrogen % | |
| | | | calc. | experimental | calc. | experimental |
| S3M | flat flakes | 58 | 72.78 | 72.53 | 7.16 | 7.20 |
| S3A | white powder | 65 | 71.98 | 71.89 | 6.71 | 6.75 |
| S6M | flat flakes | 67 | 74.70 | 74.98 | 8.24 | 8.05 |
| S6A | flat flakes | 65 | 74.13 | 73.96 | 7.92 | 7.97 |
| S11M | flat flakes | 62 | 76.88 | 77.02 | 9.46 | 9.53 |
| S11A | flat flakes | 70 | 76.52 | 76.83 | 9.26 | 9.06 |

For the synthesis of both methacrylate and acrylate esters, the following procedure is used.

In a dry round-bottomed flask equipped with a pressureequilibrated dropping funnel, top fitted with a calcium chloride drying tube, acryloyl chloride (1.10 g, 0.0120 mole) is added dropwise over a period of one hour to a stirred, ice-cooled solution of S60H (2.13 g, 0.00500 mole), anhydrous triethylamine (0.62 g, 0.0110 mole), and 200 ml fresh distilled THF. The reaction mixture is warmed slowly to room temperature, and stirred overnight (30 hours for methacrylation). The reaction mixture is filtered and evaporated to dryness. Further purification by column chromatography and recrystallization is similar to that previously described. The procedure yields 2.01 g (75%) of flat flakes.

Polymerization is subsequently carried out, using techniques similar to those described in the preceding.

POLYMERIZATION OF MIXED ACRYLATES AND METHACRYLATES

In a still further experiment, in order to broaden the liquid crystal range, acrylates are mixed with methacrylates having corresponding numbers of methylene groups. Mixtures of S3M with S3A are thus prepared.

The stilbene-type monomers are photopolymerized at different temperatures in the crystalline phase, the mesophase, as well as in the isotropic phase. The percentage polymerization obtained is determined by measuring the weight of the polymer before and after extraction with chloroform. The portion dissolving is found to be essentially pure monomer, as determined by gel permeation chromatography.

Details of the polymerizations are described in the following Table 10.

TABLE 10

| | Typical Conditions and Percentages of Polymerization | | | | | |
|---|---|---|---|---|---|---|
| | Polymerization in Liquid Crystalline and Crystalline Phase | | | Polymerization in Isotropic Phase | | |
| Polymer type | Temp (°C.) | Time (hour) | Conversion (%) | Temp (°C.) | Time (hour) | Conversion (%) |
| PS3M | 22 | 60 | ~100 | 65 | 3 | ~100 |
| PS3A | 22 | 60 | ~100 | 49 | 3 | ~100 |
| | −2$^a$ | 120 | ~100 | | | |
| | 18$^a$ | 90 | ~100 | | | |
| | 18 | 90 | ~100 | | | |
| | 36.5$^a$ | 72 | ~100 | | | |
| PS6M | 22 | 60 | ~100 | 49 | 3 | ~100 |
| PS6A | 22 | 60 | ~100 | 65 | 3 | ~100 |
| | 60 | 5 | ~100 | | | |
| PS11M | 22 | 60 | ~100 | 80 | 3 | ~100 |
| PS11A | 22 | 60 | ~100 | 80 | 3 | ~100 |

$^a$quenched in dry ice, then raised to the temperature desired.

The polymerization of monomers with epoxy reactive groups is examined in the following.

PREPARATION OF 4, 4'-DI(5-HEXENYLOXY)-5-BIPHENYL

Freshly cut sodium (0.190 g, 8.34×10$^{-3}$ mole) is dissolved in 20 ml of absolute ethyl alcohol. After the sodium is completely dissolved 4, 4'-biphenyl (0.776 g, 4.97×10$^{-3}$ mole) is added simultaneously. The ethyl alcohol is then removed using a rotovapor to form the sodium salt of 4, 4'-biphenyl. N-methyl-2-pyrrolidinone (2.0 mL) is thereafter added to the mixture. When the sodium salt has completely dissolved, 6-chloro-1-hexene ($3 \times 4.17 \times 10^{-3}$ mole) is added to the reaction mixture. The reaction is stirred at 110° C. under a nitrogen atmosphere overnight, cooled, and poured into water. The resulting precipitate is filtered, washed with a dilute aqueous solution of sodium hydroxide, with water, and then dried in a vacuum. The product is recrystallized from methanol and chloroform to yield white crystals, which are found to have a melting point of 51.2° proceeding from the crystalline to the smectic phases, and 119.5° C. going from the smectic to the isotropic phase.

EPOXIDATION REACTION

The 4, 4'-di(5-hexenyloxy)-5-biphenyl prepared according to the preceding reaction is epoxidized by mixing (1.75 g, $5 \times 10^{-3}$ mmol) with metachloroperoxybenzoic acid (1.72 g, $1 \times 10^{-2}$ mmol) and sodium bicarbonate (0.84 g, $1 \times 10^{-2}$ mmol) in 20 mL of perchloroethylene, and stirring the mixture at 5° C. for 15 hours. The reaction mixture is washed several times with a saturated solution of sodium sulfite, followed by water washing, and then drying. The methylene chloride is evaporated under vacuum to give B4E in which the B again represents the 4, 4' dioxybiphenyl mesogen, while the number represents the methylene units separating the mesogen from the terminal epoxy groups. The product is crystallized from methanol to give shiny white crystals (1.85 g, 99% yield).

In a subsequent experiment, B1E is prepared by dissolving freshly cut sodium (0.190 g, $8.34 \times 10^{-3}$ mole) in 20 mL of absolute ethyl alcohol. After the sodium is completely dissolved, 4, 4'-biphenyl (0.772 g, $4.17 \times 10^{-3}$ mole) is added. The ethyl alcohol is then removed using a rotovapor to form the sodium salt of 4, 4'-biphenyl, and N-methyl-2-pyrrolidinone (20 mL) is added to the mixture. When the sodium salt has completely dissolved, epichlorohydrin (1.5 g, $16.68 \times 10^{-3}$ mmol) is added to the reaction mixture. The reaction is stirred for 3 hours at 100° C. under nitrogen atmosphere, cooled, and poured into water. The resulting precipitate is filtered, washed with water, and dried in a vacuum. The product is recrystallized from methanol and chloroform to give 1.2 g (80%) yield of white crystals.

POLYMERIZATION

The epoxidized compounds described are subsequently polymerized by mixing equimolar amounts of the epoxidized compound selected with p-phenylenediamine, in a chloroform solvent. The solution is evaporated to dryness and the solids thus obtained spread across a glass slide protected with a cover glass. The slide is thereafter heated for from about 10 to 15 hours at 100° C. on a Mettler hot stage. The initial birefringent areas of the material remain unchanged throughout the heating process. After heating, the temperature of the resin can be raised to 220° C., the temperature limit of the stage, with no change in structure being observed. Since B1E melts at 157° C., while B4E melts at 110° C., the retention of birefringence at 220° C. indicates that the materials have polymerized with cross-linking. Similar results are obtained when the molar ratio of the epoxy compound is twice that of the amine compound, which latter may be p-phenylenediamine, diethyenetriamine, or equivalent amines.

While in accordance with the patent statutes, a preferred embodiment and best mode has been presented, the scope of the invention is not limited thereto, but rather is measured by the scope of the attached claims.

What is claimed is:

1. A smectic polymer prepared by polymerizing a mesogen-containing molecule, said mesogen having two side chains attached thereto that contain functional groups at the ends thereof, wherein said mesogens and said functional groups are separated by at least one to about eleven spacer atoms, said functional groups being selected from a member of the group consisting of vinyl ester groups and epoxy groups, said mesogens having the general formula

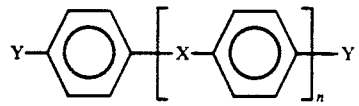

where X is selected from, $-CH_2CH_2$, $CH_2S$, $CH_2O$, $-O-C=O$, and $CO-NH-$, where Y is selected from O, S, and

and n is selected from 1 and 2.

* * * * *

UNITED STATES PATENT AND TRADEMARK OFFICE
CERTIFICATE OF CORRECTION

PATENT NO. : 5,078,910

DATED : January 7, 1992

INVENTOR(S) : Morton H. Litt

It is certified that error appears in the above-identified patent and that said Letters Patent is hereby corrected as shown below:

Column 5, lines 53, 54 and 55, substitute --the number of spacer atoms-- for "'n'".

Signed and Sealed this

Sixth Day of April, 1993

Attest:

STEPHEN G. KUNIN

*Attesting Officer*   Acting Commissioner of Patents and Trademarks